US005790699A

United States Patent [19]
Jackson et al.

[11] Patent Number: 5,790,699
[45] Date of Patent: Aug. 4, 1998

[54] MACRODETECTOR BASED IMAGE CONVERSION SYSTEM

[75] Inventors: Warren B. Jackson, San Francisco; David A. Jared, Sunnyvale, both of Calif.; Sumit Basu, Cambridge, Mass.; David K. Biegelsen, Portola Valley, Calif.

[73] Assignee: Xerox Corporation, Stamford, Conn.

[21] Appl. No.: 549,379

[22] Filed: Oct. 27, 1995

[51] Int. Cl.$^6$ .............................. G06K 9/48; G06K 9/36; G06K 9/32

[52] U.S. Cl. ..................... 382/199; 382/288; 382/299

[58] Field of Search ................................ 382/199, 288, 382/299, 274, 275; 358/461

[56] References Cited

U.S. PATENT DOCUMENTS

| | | | |
|---|---|---|---|
| 4,771,471 | 9/1988 | Kitamura | 382/41 |
| 4,979,221 | 12/1990 | Perryman et al. | 382/100 |
| 5,115,476 | 5/1992 | Ito | 382/199 |
| 5,351,309 | 9/1994 | Lee et al. | 382/199 |
| 5,541,652 | 7/1996 | Jackson et al. | 348/332 |
| 5,578,837 | 11/1996 | Jackson et al. | 257/53 |

OTHER PUBLICATIONS

Lindhohm, Lars and Edwards, Ian K., "Analog position sensing photodetectos: new life for an old technology", Photonics spectra, vol. 25, No. 11, p. 149, Nov. 1991.

Sah, Wen–Jyh and Lee, Si–Chen, "Amorphous silicon four quadrant orientation detector (FOQUOD) for application to neural network image sensors", Technical Digest of the 1990 IEDM, pp. 291–294.

Forte, P. "A simple method of segmentation with subpixel accuracy." IEE, Third International Conference on Image Processing and Its Applications (Conf. Publ. No. 307), 1989, pp. 403–405.

Kisworo, M. et al. "Modeling Edges at Subpixel Accuracy Using the Local Energy Approach." IEEE Transactions on Pattern Analysis and Machine Intelligence, vol. 16, No. 4, Apr. 1994, pp. 405–411.

Lyvers, E.P. et al. "Subpixel measurements using a moment–based edge operator." IEEE Transactions on Pattern Analysis and Machine Intelligence, vol. 11, Iss. 12, Dec. 1989, pp. 1293–1309.

Mullikin, J.C. "Boundary description and measurement with sub–pixel/–voxel accuracy." IEEE Comput. Soc. Press, Proceedings. 11th IAPR International Conference on Pattern Recognition. vol. III. Conference C: Image, Speech and Signal Analysis, Aug. 30–Sep. 3, 1992, pp. 6–8.

(List continued on next page.)

*Primary Examiner*—Joseph Mancuso
*Assistant Examiner*—Ha Tran Nguyen
*Attorney, Agent, or Firm*—Robert A. Burtzlaff

[57] ABSTRACT

An image detection and pixel processing system includes a plurality of detector elements for receiving an image. The detector elements are subdivided into a plurality of macrodetectors, with each macrodetector constituting four or more detector elements, and with each macrodetector providing information for determining both a total light intensity value within the macrodetector and a centroid of light intensity indicative of light intensity position within the macrodetector. An image processing assembly receives information from the plurality of macrodetectors, with the image processing assembly relating a pixel and its encompassed subpixel area to each corresponding macrodetector, and further determining the total light intensity within the pixel and the centroid of light intensity within the subpixel. The image processing assembly is capable of rendering each subpixel area as an edge when magnitude of the centroid of light intensity is greater than a predetermined threshold.

11 Claims, 4 Drawing Sheets

OTHER PUBLICATIONS

Nalwa, V.S. et al. "On Detecting Edges." IEEE Transactions on Pattern Analysis and Machine Intelligence, vol. PAMI-8, No. 6, Nov. 1986, pp. 699–715.

Tabatabai, A.J. et al. "Edge Location to Subpixel Values in Digital Imagery." IEEE Transactions on Pattern Analysis and Machine Intelligence, vol. PAMI-6, No. 2, Mar. 1984, pp. 188–201.

Xu, C. et al. "Precise localization of geometrically known image edges in noisy environment." IEEE, IECON '90. 16th annual Conference of IEEE Industrial Electronics Society (Cat. No. 90CH2841-5), 1990, vol. 1, pp. 346–349.

MACRODETECTOR BASED IMAGE CONVERSION SYSTEM

FIELD OF THE INVENTION

The present invention relates to an imaging system capable of detecting and preserving high frequency spatial information in images. More particularly, the present invention relates to an imaging system that utilizes macrodetectors to increase edge detection response in captured or scanned digital images.

BACKGROUND AND SUMMARY OF THE INVENTION

The human eye's response to high spatial frequency content in images is highly dependent on the nature of the features. For example, the eye integrates certain types of high frequency intensity variations, such as closely spaced black dots or lines, by smoothing them to present an appearance of solid gray. In contrast, other types of high frequency intensity variations, such as high contrast edges or mismatched lines, are not smoothed. Edge or line misalignments remain detectable at even very high spatial frequencies. Vision research has determined that for a pattern of adjacent vertical strips of 0% and 100% intensities (black and white, respectively), the ability of the human visual system to distinguish the pattern from the average gray drops off significantly at around 150 cycles/inch for a standard viewing distance of 12". For lower levels of contrast between the intensities, the response drops off at even lower spatial frequencies. Yet, the visual system remains extremely sensitive to high contrast (non-periodic) steps in an image, such as black-white edges. Though edges contain information at frequencies far higher than 150 cycles/inch, the visual system does not smooth or blur the edge, remaining sensitive to its exact position. This property of the human visual system has been termed hyperacuity, since it permits an effective acuity for certain classes of objects as much ten times normal visual acuity. The hyperacuity effect can be easily observed by looking at page having closely spaced lines, with some lines being broken slightly to provide a line mismatch. When the page is held far enough away, the majority of lines will appear to blend into continuous tones, but comparably sized small projections where the lines do not match will remain sharp and clear.

Unfortunately, the hyperacuity of human vision presents certain problems for digital imaging devices such as scanners. The problem is particularly acute in documents or media containing both text and photographic or halftoned images. A scanner is required to render photos or halftoned images in a document as continuous gray tones, yet must still be able to place text edges with high pixel accuracy. Several different approaches have been pursued to address this problem. Commonly, preprocessing of the image is utilized to segment the document into text and image portions. Text-like features are identified in a document and processed separately from the halftoned or continuous images. Typically, processing algorithms that enhance line features are used with text, while smoothing algorithms are used with the halftone or continuous images. While this improves image quality, reliable automatic segmentation algorithms are difficult to develop, and segmentation often fails when text is embedded in a continuous tone image.

Accordingly, an object of the present invention is to provide an imaging system capable of reconstructing visually significant features in scanned images (at a hyperacuity level resolution) using improved processing methods that obviate the need for image segmentation. The present invention allows for the use of inexpensive conventional p-i-n detectors. When visible light or other type of incident radiation (e.g. ultraviolet, infrared, etc.) strikes a suitably biased p-i-n detector element, electron-hole charge pairs are generated in the intrinsic layer (i-layer). The electrons are separated from the holes by the electric field between the p-layer and the n-layer, with electrons tending to flow toward the n-layer and holes tending toward the p-layer. The electrons in the n-layer then flow to a contact, with current at the contact proportional to the light intensity. For the purposes of the present invention, a plurality of detector elements (typically four detector elements) are logically grouped to form a macrodetector. Light intensity distribution is determined within the macrodetector to identify pronounced disjunctions in light intensity distribution, usually corresponding to edges in an image. Using this light intensity distribution information, at least a portion of the macrodetector (typically its center) is digitally rendered as a single pixel, allowing subpixel information concerning light intensity distribution within the macrodetector to be preserved to improve edge rendering in the final processed image.

The use in accordance with the present invention of a macrodetector that preserves subpixel information allows for reproduction of documents having visually significant features in both text and continuous tones without prior segmentation. Ideally, the rendering must accurately reproduce features that would be visible to a hyperacuity capable human eye at normal viewing distances. The present invention allows for superior resolution of critical high contrast edge and line features, while still smoothly integrating high frequency features used to simulate continuous tones.

Yet another object of the present invention is to provide a computationally efficient method for rendering visually significant features in an image. In contrast to many prior art methods that require segmentation, or isolation of edge features spanning large areas of an image, the method of the present invention does not require multiple passes over widely separated portions of the image. This can advantageously save significant time during processing and rendering.

Still another object of the present invention is to provide a processing method that operates locally, and does not require extensive sampling of adjacent pixels during image rendering. Operation of the apparatus or method of the present invention does not require much contextual information concerning light intensity in nearby pixels, typically requiring only gray level information from at most two adjacent pixels, and often requiring information from only one adjacent pixel. Again, this reduces processing time, and has the additional advantage of reducing overall image errors. Since local errors in rendering do not propagate outside a single pixel (corresponding to a single macrodetector area composed of multiple detector elements), the possibility of creating visually perceptible artifacts during rendering are greatly reduced as compared to prior art global image rendering techniques.

Another advantage of image processing and rendering in accordance with the present invention is the ability to use a bilinear model that preserves total intensity over each macrodetector rendered. Additionally, since corners and edges of adjacent rendered areas always match in intensity, the rendered image is visually smoother and more consistent.

A minor advantage of the present invention is the ability to extract segmentation information from edge information determined during rendering. As previously discussed, segmentation refers to the process of dividing an image into several regions according to the category of image content (i.e., regions of text, regions of halftoned images, etc.). Since the rendered output for text and line art images contains a large fraction of macrodetectors (pixels) with edges, while the output for continuous tone images has a much smaller fraction, the fraction of edge-containing macrodetectors (pixels) for a given area of an image can be used as a statistical measure to determine whether that area of the image contains text or illustrations. The segmentation information derived from practice of the apparatus or method of the present invention can be useful for systems that do require segmentation, such as an optical character recognition system for text analysis.

In accordance with the aforesaid objects and advantages, the present invention provides an image detection and pixel processing system having a plurality of detector elements to receive an image. Multiple detector elements are grouped into macrodetector elements, with each macrodetector element providing information for determining both a total light intensity value within the macrodetector element and a centroid of light intensity indicative of light intensity position within the macrodetector element.

An image processing assembly is connected to receive information from the plurality of detector elements logically grouped into multiple overlapping macrodetectors. The image processing assembly further determines the total light intensity within each detector element in the macrodetector, the centroid of light intensity within the macrodetector, with the image processing assembly rendering a portion of the macrodetector as an edge when magnitude of the centroid of light intensity is greater than a predetermined threshold.

In preferred embodiments, the image processing assembly renders an edge passing through a macrodetector by finding a first gray value on a first side of the edge, determining actual edge position, and using actual edge position and the first gray value to determine a second gray value on a second side of the edge opposite the first side of the edge. The actual edge position can be further determined by partially determining parameterization of the edge using gray-on-gray moments, and converting gray-on-gray moments to gray-on-black to uniquely define edge location. For best computational efficiency, determining parameterization of the edge using gray-on-gray moments uses lookup tables instead of explicit calculation of edge parameters. The lookup tables are used to map moments of the centroid of light intensity onto an edge parameter.

In a most preferred embodiment, the image processing assembly renders only a central portion of each macrodetector, with the macrodetectors overlapping. Accordingly, when four detectors are grouped to form a macrodetector, each individual detector actually is used as a different corner detector in four macrodetectors. Overlapping macrodetectors in this manner allows for consistent rendering of a subpixel representing a center of the macrodetector. For best results, when an edge passing through a macrodetector causes the magnitude of the centroid of light intensity to be greater than about ⅓ (where the centroid can vary between 0 and 1), the edge is rendered with subpixel precision. When the centroid of light intensity is smaller than that ⅓ threshold, the pixel intensity is determined using a plane model of intensity, and no subpixel edge features are located in the rendered pixel.

As will be appreciated by consideration of the present invention, output for each macrodetector is a set of four parameters, describing either the position, orientation, and intensity levels of an edge or the coefficients for a continuous description (either plane model or bilinear model). Advantageously, since this is an analytic description of the subpixel area, operations such as scaling and rotation are relatively simple: the representation can be held constant, while the area of the output image corresponding to each detector can be scaled or rotated. As long as a transformation can be found between a point on the original location of the detector to the new coordinate system of the rendered pixel in an image, the rendering can be performed on these transformed coordinates.

Additional objects, advantages, and features of the present invention will become apparent from consideration of the following description and drawings of preferred embodiments.

DETAILED DESCRIPTION OF THE INVENTION

Figure 1:
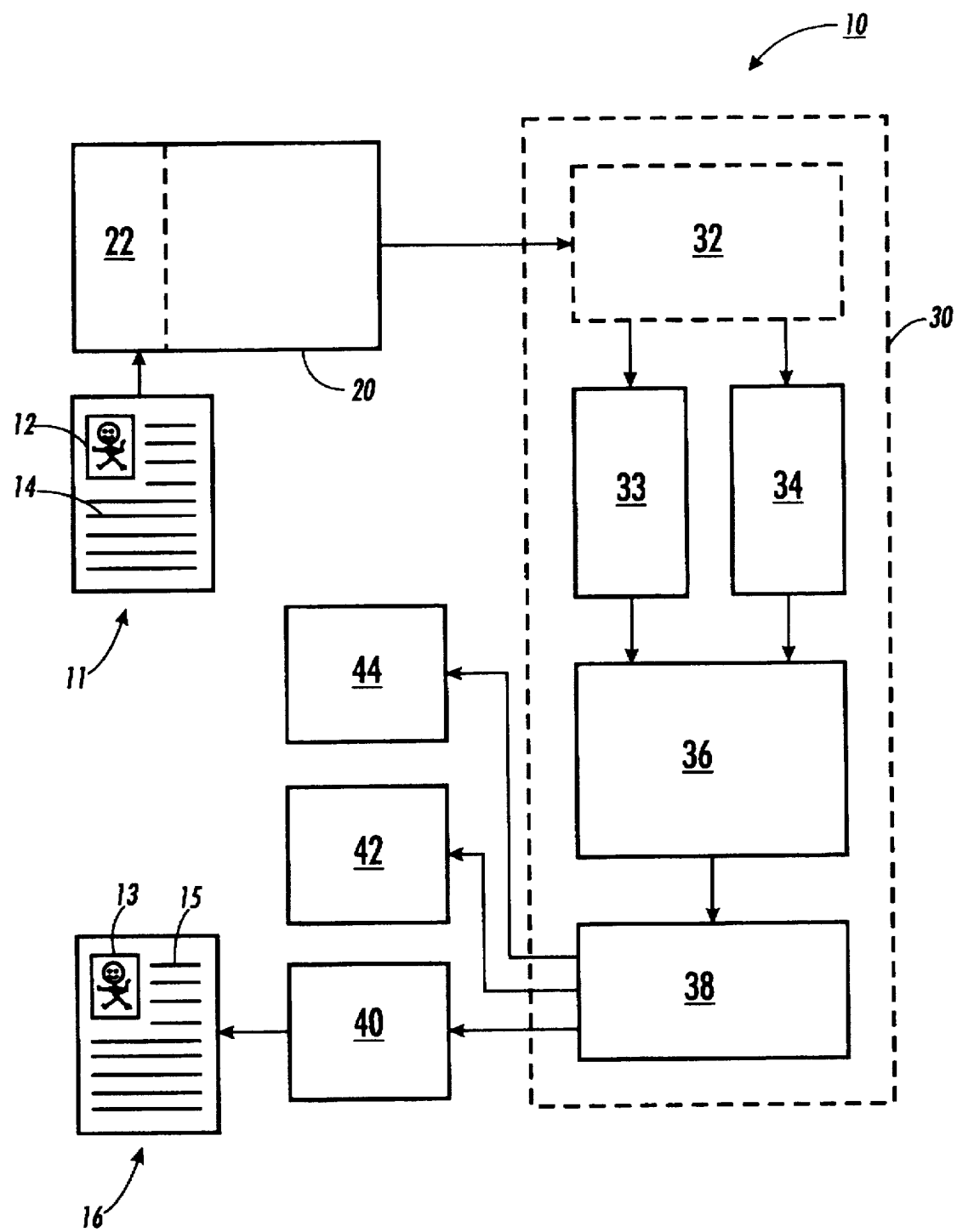
FIG. 1 is a schematic outline of a document processing system, including a scanner having a plurality of detector elements to digitally scan documents incorporating both text and figures, an image processing assembly in accordance with the invention, and output devices such as video displays or printers.

A document processing system 10 suitable for digitally scanning, image processing, rendering, and displaying a document 11 having both a FIG. 12 and text 14 is shown in FIG. 1. Digital scanning is accomplished with a scanner 20 incorporating a detector array 22. In one preferred embodiment, the detector array 22 is a two dimensional array sized to correspond to a typical page to be scanned, permitting essentially simultaneous capture of the entire page image. Alternatively, a sufficiently long linear array can be used to scan a "window" having a width of a conventional sized page, with the position of the scanning window being moved lengthwise along the page (by physical movement of the detector array 22, the document 11, or optical movement of the scanning window using rotating mirrors, prisms, etc.). As will be appreciated, alternative scanning schemes, including the use of multiple independent arrays scanning contiguous sections of a document 11, can of course be employed.

The scanner 20 directs signals corresponding to the detected light levels by the detector array 22 to an image processing assembly 30. The image processing assembly 30 can be a general purpose serial or parallel computer having an accessible memory 32 and processor(s) attached by a network (not shown) to the scanner 20, or alternatively can include dedicated hardware directly incorporated into the body of the scanner. The memory 32 of the image processing assembly 30 is used to store the digital representation of a light intensity map corresponding to a document 11 that is received from the scanner 20, along with any other additional light or image related information that may be available. The received information is processed by a light intensity unit 33 and a moment calculation unit 34 to determine the centroid of light intensity. This combined information is used by a gray level rendering unit 36 to determine the appropriate gray level for each rendered pixel in a constructed bitmap (not shown). The bitmap is transferred to a device specific conversion unit 38 to transform the bitmap into a form suitable for printing by a printer 40 (providing reproduced document 16 with reproduced FIG. 13 and reproduced text 15). Alternatively, the device specific conversion unit 38 can provide signals suitable for transient display of the reproduced document on a video display 42, long term storage in a storage unit 44 (which may include magnetic disk or optical storage) as a bitmap or proprietary image file, or use in conjunction with any other conventional output device.

Operation of the image processing assembly 30 requires information concerning light intensity distribution determined by scanner 20. In a most preferred embodiment of the present invention schematically illustrated in FIG. 2, this light intensity information is provided by the use of detector array 22, ideally configured as a two dimensional detector array (although line detector arrays that are scanned across the page can of course be employed). Each detector element 71 in the two dimensional array 22 has a p-layer 52 (formed from conventional p-type doped semiconductive material for example boron-doped crystalline or amorphous silicon), an i-layer 54 (formed from conventional intrinsic semiconductive material), and an nlayer 56 (formed from conventional n-type doped semiconductive material), that together operate as a p-i-n junction device. When visible light or other type of incident radiation 50 (e.g. ultraviolet, infrared, etc.) strikes a suitably voltage biased position sensitive detector 71, electron-hole charge pairs are generated in the i-layer 54. The electrons are separated from the holes by the electric field between the p-layer and the n-layer, with electrons tending to flow toward the n-layer 56 and holes tending toward the p-layer 52. The electrons in the n-layer then flow to contacts (not shown) with currents generated being proportional to total light intensity in each detector element 71. As those skilled in the art will appreciate, various enhancements, modifications, or adjustments to the materials or construction of the described detector elements 71 can be made, for example, to improve light capture, extend light frequency sensitivity, optimize response time, or enhance linearity of light/current response.

For use in scanners, a detector array embodiment in accordance with the present invention will generally have individual detector elements sized to be less than 500 microns, with detectors sized in the 50 to 150 micron range being typical. Detectors having the foregoing approximate size ranges can be grouped into two dimensional arrays that would permit 100 to 600 spot per inch image capture over an area the size of a printed page, or grouped in linear arrays that can be used to scan a page at a similar resolution. Each detector element 71 in the array 22 sends digitized signals corresponding to its light induced currents to be temporarily stored in memory 32 of the image processing assembly 30. For image processing purposes, a plurality of detector elements are logically grouped into a set of overlapping macrodetectors. A representative macrodetector 60 is illustrated by dotted lines in FIG. 2. The actual macrodetector rendered area 62, consisting of a central portion of the macrodetector 60, is also illustrated by dotted line in FIG. 2.

Operation of light intensity unit 33, moment calculation unit 34, and the gray level rendering unit 36 generally proceeds as follows:

A. Use digital representations stored in memory 32 to determine $I_0$ (total intensity) of macrodetectors in the light intensity unit 33;

B. Use digital representations in memory 32 to determine x and y moments (centroid) of the intensity distribution incident on each macrodetector;

C. If the magnitude of the centroid is large, use gray level rendering unit 36 to render an area as an edge, using contextual gray values of adjacent detector elements, and interpolating if necessary. This information is used to find edge parameters, giving the actual edge position and allowing rendering of the edge between two gray levels G1 and G2 with subpixel precision.

D. If the magnitude of the centroid is small, determine pixel intensity and render area as a non-edge, typically using a bilinear plane model.

As will be appreciated by inspection of FIG. 1, operations A and B can be determined concurrently, and results of both must be available for operation of either C or D. Concurrent or parallel operation reduces image processing time, as does the local scope of the procedure, which does not require extensive sampling of adjacent pixels during image rendering. In addition, operation of the present invention does not require much contextual information concerning light intensity in nearby pixels, typically requiring only gray level information from at most two pixels adjacent to the macrodetector, and often requiring information from only one adjacent pixel. Again, this reduces processing time, and has the additional advantage of reducing overall image errors. Since local errors in rendering do not propagate outside the detector area (a single pixel), the possibility of creating visually perceptible artifacts during rendering are greatly reduced as compared to global image rendering techniques that are not as highly parallel and must sample many distantly located pixels.

More specifically, operation of the light intensity unit 33 to determine a total light intensity in each macrodetector 60 and a moment calculation unit 34 to determine the centroid of light intensity within each macrodetector 60 is based on the received information held in memory 32. Light intensity within each pixel of a bitmap representing the detected light intensity by each macrodetector is simply proportional to the summed values of the detector elements forming the macrodetector (e.g., detector elements 71, 73, 75, and 77 in FIG. 2). In a typical application, this total detected current output can be digitally converted to a 8-bit light intensity representation (0–255 range), suitable for representing black and white continuous and halftone applications, as well as text and lineart. Color bitmaps can be created by scanning with 8-bit precision at multiple frequency ranges, and of course as those skilled in the art will appreciate, scanning resolution can be varied to match effective resolution of output devices (printers, CRT monitors, etc.), or to meet speed criteria or memory limitations, with coarser image resolutions or black and white images requiring substantially less time and memory to scan, process, and render.

Because of certain degeneracies in macrodetector centroid moments (i.e., there is no unique mapping between the edge light intensity distribution and the centroid), it is impossible to analytically determine a unique edge for macrodetectors given the centroid of light intensity. However, it is possible to arrive at an approximate determination of edge position in an image given a centroid of light intensity provided by the moment calculation unit 34. This is best illustrated with reference to FIG. 2, which schematically shows the four adjacent detectors 71, 73, 75, and 77. As illustrated, there are two distinct gray levels of illumination of the detectors, with a dotted outline marking an area 81 illuminated at a first gray level 79 and a remaining area 82 illuminated at a second gray level 83. An edge 80 demarcates a boundary between the first gray level 79 and the second gray level 83. Detector 71 is completely illuminated at gray level 79, while detector 73 is nearly completely illuminated, with a majority of its area maintained at the first gray level 79, with a minor portion on the opposite side of edge 80 is illuminated at a gray level 83. Similarly, detector 77 also has a majority of its area maintained at the first gray level 79, while a minor portion on the opposite side of edge 80 is illuminated at a first gray level 83. Finally, detector 75 is nearly completely illuminated at the second gray level 83 (note that this can be considered to correspond to $G_2$ in the following discussion of centroid calculation for the general case), with a minor portion illuminated at gray level 79 (gray level 79 corresponding to $G_1$ in the following discussion of centroid calculation for the general case). The overall (integrated) gray level 70 for the macrodetector 60 is the average of the gray level light intensities in each detector element 71, 73, 75, and 77.

Figure 2:
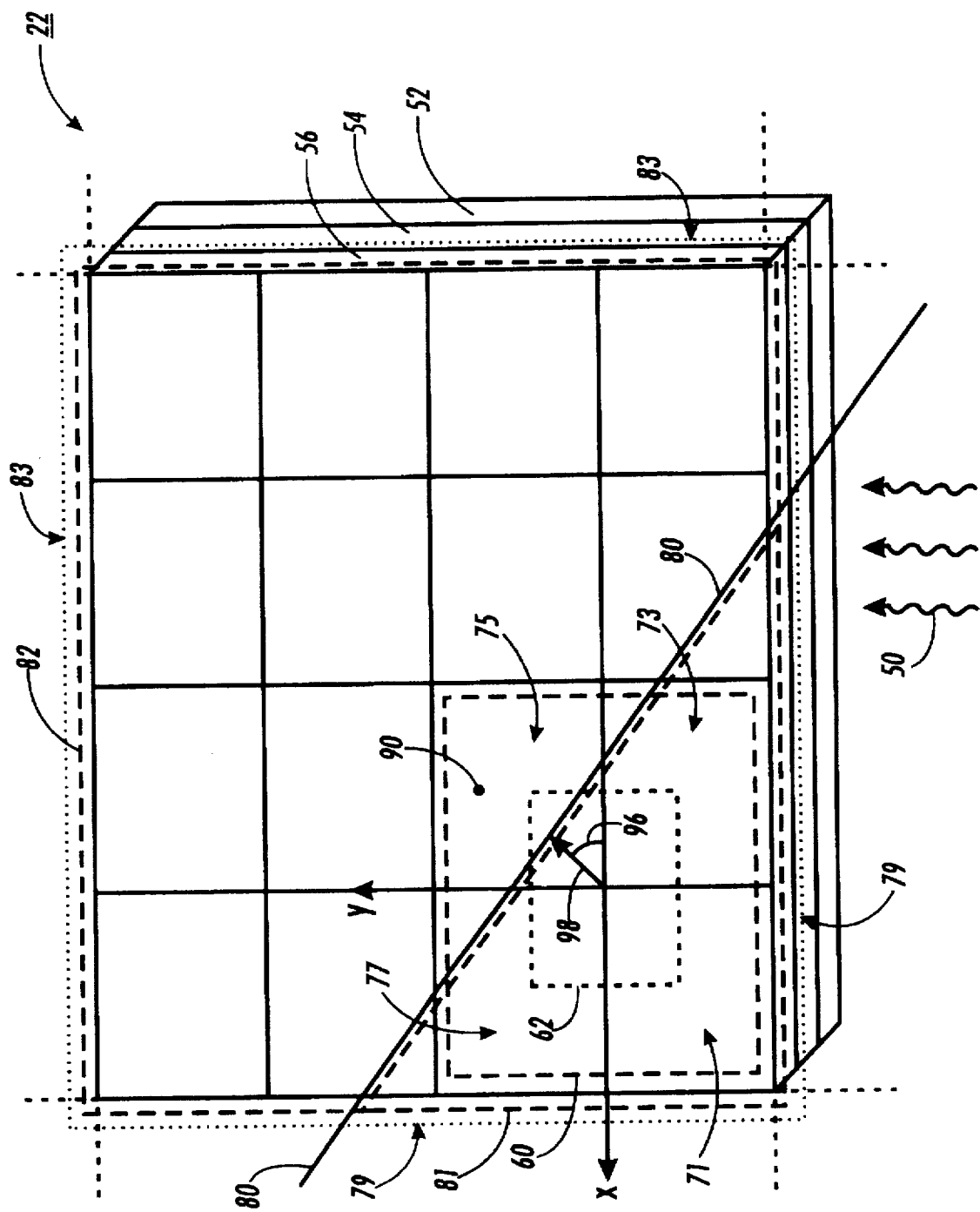
FIG. 2 illustrates a two dimensional detector array, with a macrodetector composed of four detector elements being shown.

To better comprehend both determination of a centroid of light intensity in the macrodetector 60 and the corresponding derived edge determination, the macrodetector 60 in FIG. 2 has been overlain with an x-axis 94 and a y-axis 92, having an origin centered on the macrodetector 60. The x-axis 94 magnitude is taken to be between $-1$ and $1$ at opposing edges of the detector surface, while the y-axis 92 is similarly scaled to have a magnitude between $-1$ and $1$ at opposing edges of the detector.

When the integrated intensities falling on each detector elements 71, 73, 75, and 77 are represented by the values $I_{71}$, $I_{73}$, $I_{75}$, and $I_{77}$, the total average light intensity, $I_0$ is given by $$I_0 = (I_{75}+I_{73}+I_{77}+I_{71})/4$$

and the x and y centroids of the light falling on the macrodetector 60 are computed using the relations $$\bar{x} = (1/2)\left(\frac{I_{75}+I_{73}-I_{77}-I_{71}}{I_{75}+I_{73}+I_{77}+I_{71}}\right) = (1/2)\left(\frac{I_{75}+I_{73}-I_{77}-I_{71}}{I_0}\right)$$

$$\bar{y} = (1/2)\left(\frac{I_{75}-I_{73}+I_{77}-I_{71}}{I_{75}+I_{73}+I_{77}+I_{71}}\right) = (1/2)\left(\frac{I_{75}-I_{73}+I_{77}-I_{71}}{I_0}\right)$$

where the absolute value of $\bar{x}$ and $\bar{y}$ varies between $-1$ and $1$. If the magnitude of the centroid $M=(x^2+y^2)^{1/2}$, is greater than a value T, where T beneficially may be taken to be about $\frac{1}{3}$, the portion of the macrodetector 60 that falls within the rendered portion of the pixel 62 (the dotted rectangular outline having respective boundaries extending parallel to $x=(\pm\frac{1}{2})$ and $y=(\pm\frac{1}{2})$) is rendered to have edge 80, while for those centroid magnitudes M<T, the image intensity is assumed to continuously vary within the rendered portion 62. In the latter case, the intensity within region 62 at a position (x,y) is assigned a value given by the bilinear formula $I(x,y)=I_7 (\frac{1}{2}-y)+I_{73}(\frac{1}{2}+x)(\frac{1}{2}-y)+I_{75}(\frac{1}{2}+x)(\frac{1}{2}+y)+I_{77}(\frac{1}{2}-x)(\frac{1}{2}+y)$ The value of the intensity at the four corners of $(x =\pm\frac{1}{2},y \pm\frac{1}{2})$ is the intensity of the corresponding detector. Use of the bilinear model ensures that corners and edges of rendered macrodetectors will have matching intensities, both improving visual appearance and preserving total intensity over the area of each rendered macrodetector. Of course, other conventional rendering models for determining intensity of pixels having no subpixel edges can also be used as desired.

If the magnitude of the centroid is large (M>T), requiring rendering of an edge to provide subpixel accuracy, certain simplifying assumptions must be made. Parameters defining the edge within the macrodetector include the two gray values 83 and 79 on each side of edge 80, a distance along the radius line 98 drawn from the origin perpendicular to the edge 80, and an angle 96 defining the direction radius line 98 extends to meet edge 80. To permit a unique determination of the edge using the computed values of $\bar{x}$, $\bar{y}$ and $I_0$, it can be assumed that there is no more than one edge between gray levels incident on the macrodetector 60 detector and that all edges are approximately linear within the macrodetector 60. In addition, the gray values 79 and 83 are required. These gray values either can be determined from global image information obtained from extended image regions or within a local neighborhood. The former case may occur for images containing text or binary data where the dark and light values are the same throughout the region. More commonly, the gray values can be obtained adaptively from a local neighborhood of the macrodetector 60 as subsequently described.

Using the computed values of $\bar{x}$, $\bar{y}$ and $I_0$, the direction normal to edge 80 namely angle 96 and the distance 98 is approximately determined. from the $\bar{x}$ and $\bar{y}$ centroids. To ensure computational efficiency, the edge parameters (radius line 98 and angle 96) are not analytically computed de novo for each detector, but instead are determined by reference to a precalculated lookup table that provides edge parameters as a function of the moments $\bar{x}$, $\bar{y}$. For example, a lookup table having precalculated functions that provide the centroid given inputs for the angle radius line 98, angle 96, and area of macrodetector 60 can be provided. As will be appreciated, lookup table interpolation, semi-analytic techniques, or other numerical approximation techniques can of course be used.

Figure 3:
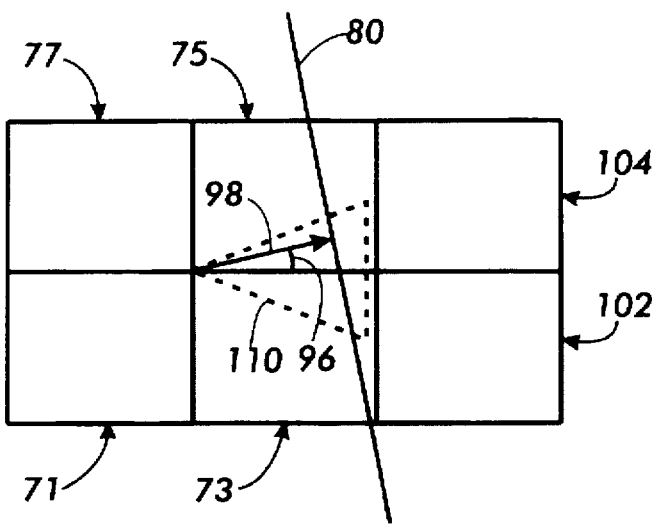
FIG. 3 depicts the macrodetector in FIG. 2 with an edge running roughly parallel to an edge and the neighboring context pixels used to determine the gray values.
Figure 4:
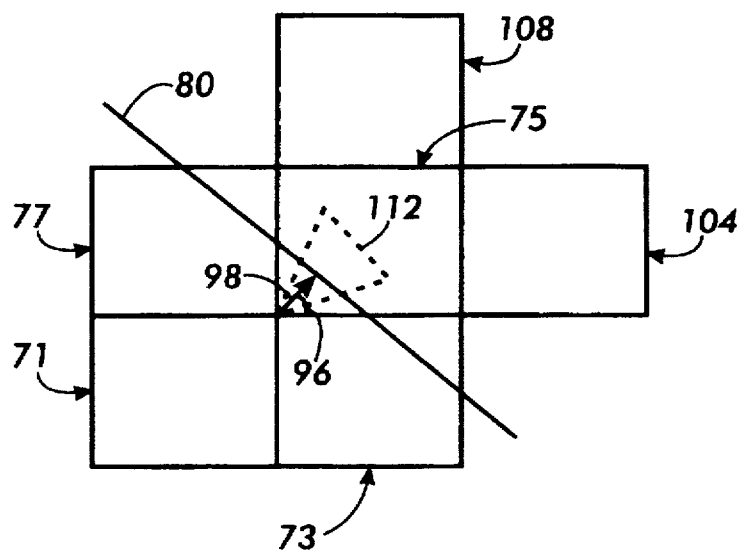
FIG. 4 depicts the macrodetector in FIG. 2 with an edge running through the center at an angle and the neighboring context pixels used to determine the gray values.
Figure 5:
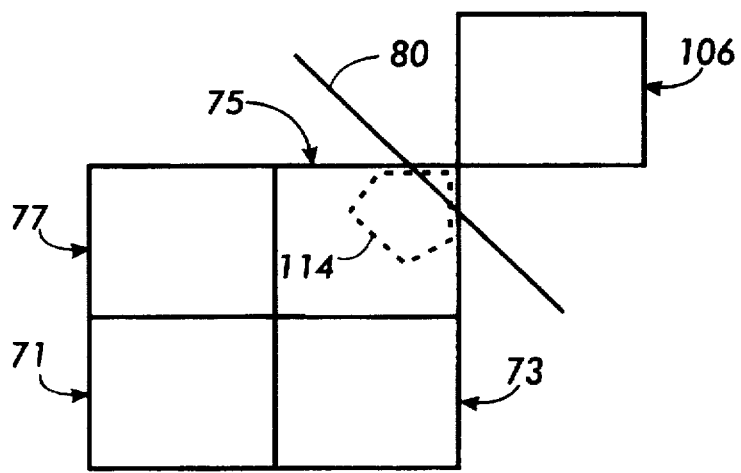
FIG. 5 depicts the macrodetector in FIG. 2 with an edge running through a corner at an angle and the neighboring context pixels used to determine the gray values.

Once initial estimates of the angle 96 and distance 98 have been obtained, appropriate estimates of the local gray values 79 and 83 can be obtained. If the estimates of angle 96 and distance 98 point to region 110 (outlined with dotted lines) in FIG. 3, one gray value is obtained by averaging intensities from neighboring detectors 102 and 104 and the other is obtained by averaging intensities from detectors 77 and 71. If the estimates of angle 96 and distance 98 point to the shaded region 112 in FIG. 4, one gray value is obtained by averaging intensities from neighboring detectors 108 and 104 and the other is obtained from detector 71. If the estimates to angle 96 and distance 98 point to the shaded region 114 in FIG. 5, one gray value is obtained from neighboring detector 106 and the other is obtained from an average of detectors 77 and 73. If any context detector such as detectors 104, 108, or 106 has a centroid magnitude, M exceeding the critical value T indicating that an edge passes nearby, it is left out of the averaging process used to determine the gray values. If all neighboring pixels possess edges, the region 62 is rendered using a non-edge model. All other combinations of angle 96 and distance 98 can be obtained from these three cases by appropriate 90 degree rotations.

Having obtained estimates for the gray values 79 and 83, the final determination of the distance 98 and angle 96 can be obtained. Let the lesser (greater) estimated gray value of 79 and 83 is $G_1$ ($G_2$) respectively. The $\bar{x}'$ and $\bar{y}'$ moments for a black-gray step from an intensity value of 0 to $G_2$–$G_1$ in terms of the moments, $\bar{x}$ and $\bar{y}$ of a gray-gray step of $G_1$ to $G_2$ by the relation $$\bar{x}' = \bar{x}\left(\frac{I_0}{I_0 - I_{G1}}\right)$$

$$\bar{y}' = \bar{y}\left(\frac{I_0}{I_0 - I_{G1}}\right)$$

The adjusted moments have the interpretation of being the moments that would be obtained if the smallest gray value of 79 and 83 were zero. The adjusted moments $\bar{x}'$ and $\bar{y}'$ are used to compute a new and fmal estimate for the distance 98 and angle 96. It is clear from the above discussion that the new direction and distance estimates could be used to obtain improved gray values and the process interated until convergence. Typically, the additional accuracy is not necessary. One can also construct functions to provide appropriate weightings of the neighboring context detectors, e.g. 104, 106, and 108 to generate the appropriate gray value estimates.

Finally, the region 62 in FIG. 2 can be rendered as an edge 80 using the estimated values for the gray levels 79 and 83 and the angle 96 and distance 98. For regions in 62 below and to the left the edge 80 defined by angle 96 and distance 98, the intensity is assigned a value 79 while above and to the right of the edge 80, the intensity is assigned a value of 83.

For greatest sensitivity, only a central portion of macrodetector 60 is rendered, corresponding as previously noted to rendered area 62 in FIG. 2. For best results, every possible grouping of four detectors is treated as a macrodetector, allowing edges to be closely followed to reduce jaggedness in the rendered image.

To better understand the present invention, the following pseudocode presents one embodiment of a simulation of a macrodetector based sensor array operating in accordance with the foregoing described steps to process images:

```
Integer N/*NXN is the number of pixels in the position sensor array*/
(1:N,1:N,1:4) array currents/*the array of currents from the array of
position sensitive sensors four currents per sensor*/
(1:M*N,1:M*N) array finalimage/*array of final image of size MNXMN*/
Main()
{GetCurrentArray(current)
Loop (EachDetectorInArray){
    averagecurrent=(current1+current2+current3 +current4)/4
    ycentroid=(current1-current2)/(current1 +current2)
    xcentroid=(current3-current4)/(current3 +current4)
    If(magnitude(xcentroid,ycentroid)<small)
        {parameters=ComputePlaneModelParameters(average,xcentroid,
            ycentroid)
        finalimage=RenderPlaneModel(parameters)
    }
    Else
        {If(GrayValuesAreGlobal)
            {grayvalues=GetGlobalGrayValues }
        Else
            {normaldirection=FindNormalDirection(averagecurrent,
                xcentroid,yc entroid)
            grayvalues=FindGrayValue(normaldirection,pixelneighbors)
        }
        newcentroids=CorrectMoments(grayvalues)
        stepedgeparameters=FindEdgeParameters(newcentroids,grayvalues)
        finalimage=RenderEdgeModel(stepedgeparameters)
    }
}
}
```

Figure 6:
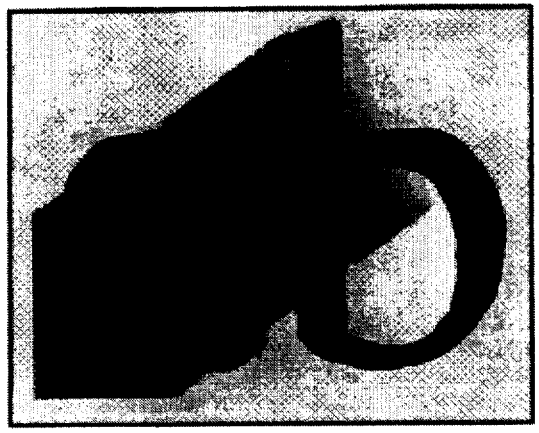
FIG. 6 is an original continuous tone image.
Figure 7:
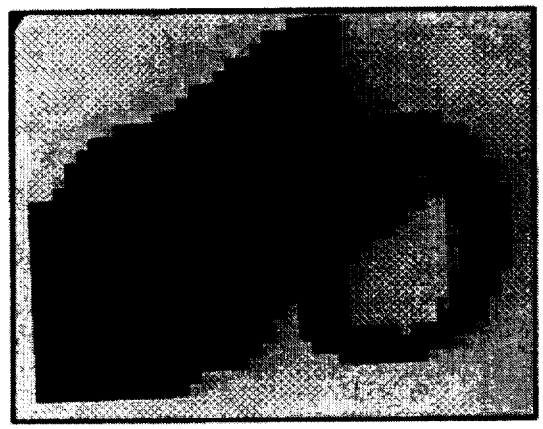
FIG. 7 is a rendered image of a scan of the image in FIG. 3 using standard detectors and gray modeling.
Figure 8:
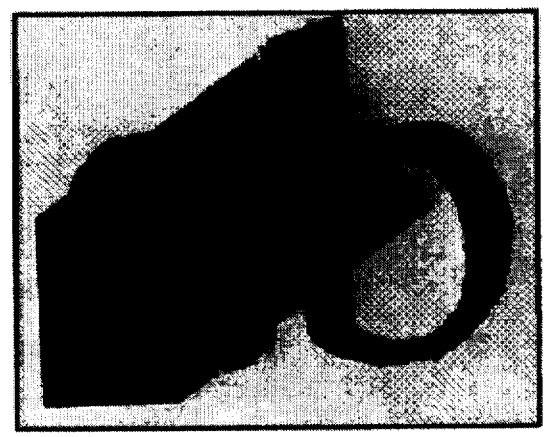
FIG. 8 is a rendered image of a scan of the image in FIG. 3 detectors grouped into macrodetectors that provide subpixel precision in accordance with the image processing system of the present invention.

As will be appreciated, rendering an image in accordance with the present invention is most useful when an image is rendered for a specific device (by device specific conversion unit 38 of FIG. 1) at a high enough resolution to permit display of the determined edge parameter (sub-pixel) information. Typically, rendering at two or more times the original scanned resolution (as measured with respect to the detector size) illustrates the substantial improvement in edge rendering for the present system and technique as compared to conventional rendering techniques that do not use subpixel information to generate a rendered image. This is best seen by comparison of FIGS. 6, 7, and 8, with FIG. 8 being created through application of software implementing the foregoing described pseudocode to simulate position sensitive detectors operating in a mode consistent with present invention. FIG. 6 illustrates an original continuous tone image, and FIG. 7 illustrates a scanned and rendered (300 dpi) image of FIG. 6 using an average intensity rendering model (gray model). In comparison, FIG. 8 illustrates a scanned and rendered image using techniques and information applicable to position sensitive detectors rendering images in accordance with present invention. As is apparent, in comparison to conventional prior art rendering of FIG. 7, the image seen in FIG. 8 more smoothly renders edges in the text feature (the letter "b") and presents less "blocky" gray level transitions in the continuous tone features.

If information regarding subpixel edge features is stored and made available for analysis, auto-segmentation techniques suitable for use in conjunction with optical character recognition machines may be available. For example, text features generally have a higher incidence of subpixel edge features than continuous tone features. This statistical difference can be used to automatically separate text from pictures in scanned images. As compared to prior art schemes that only detect well separated (block segmentation) units of text or pictures, the present invention permits autosegmentation even when the text is embedded in continuous tone images.

As those skilled in the art will appreciate, other various modifications, extensions, and changes to the foregoing disclosed embodiments of the present invention are contemplated to be within the scope and spirit of the invention as defined in the following claims.

The claimed invention is:

1. An image detection and pixel processing system comprising a plurality of macrodetector elements for receiving an image, the plurality of macrodetector elements subdivided into a plurality of detector elements, with each macrodetector constituting four or more detector elements, and with each macrodetector providing information for determining both a total light intensity value within the macrodetector and a centroid of light intensity indicative of light intensity position within the macrodetector, and an image processing assembly connected to receive information from the plurality of macrodetectors, the image processing assembly relating a pixel and its encompassed subpixel area to each corresponding macrodetector, and further determining the total light intensity within the pixel and the centroid of light intensity within the subpixel area with the image processing assembly rendering each subpixel area as an edge when magnitude of the centroid of light intensity is greater than a predetermined threshold, and wherein the image processing assembly renders the subpixel area as an edge by finding a first gray value on a first side of the edge, determining actual edge position, and using actual edge position and the first gray value to determine a second gray value on a second side of the edge opposite the first side of the edge.

2. The image detection and pixel processing system of claim 1, wherein determining actual edge position further comprises partially determining parameterization of the edge using gray-on-gray moments, and converting gray-on-gray moments to gray-on-black to uniquely define edge location.

3. The image detection and pixel processing system of claim 2, wherein partially determining parameterization of the edge using gray-on-gray moments further comprises use of lookup tables generated to map moments of the centroid of light intensity onto an edge parameter.

4. The image detection and pixel processing system of claim 1, wherein finding the first gray value is determined using context of an adjacent detector element.

5. The image detection and pixel processing system of claim 1, wherein finding the first gray value is an estimate based on interpolation of gray values of two adjacent detector elements.

6. The image detection and pixel processing system of claim 1, wherein the image processing assembly renders the subpixel area as an edge when the magnitude of the centroid of light intensity is greater than a predetermined threshold of about $1/3$.

7. An image processing method using information obtained from a plurality of macrodetectors configured to receive an image, with each macrodetector composed of at least four detector elements, the method comprising the steps of determining a total light intensity value within each of said macrodetectors, determining a centroid of light intensity indicative of light intensity position within each of said macrodetectors, relating a pixel and its encompassed subpixel area to each of said corresponding macrodetector to determine the total light intensity within the pixel and the centroid of light intensity within the subpixel area, and rendering each subpixel area as an edge when magnitude of the centroid of light intensity is greater than a predetermined threshold, and evaluating the subpixel area to determine an edge, finding a first gray value on a first side of the edge, determining actual edge position, and using actual edge position and the first gray value to determine a second gray value on a second side of the edge opposite the first side of the edge.

8. The image processing method of claim 7, wherein the step of determining actual edge position further comprises the steps of partially determining parameterization of the edge using gray-on-gray moments, and converting gray-on-gray moments to gray-on-black to uniquely define edge location.

9. The image processing method of claim 8, wherein the step of partially determining parameterization of the edge using gray-on-gray moments further comprises the step of mapping moments of the centroid of light intensity onto an edge parameter using generated lookup tables.

10. The image processing method of claim 7, wherein the step of finding the first gray value further comprises the step of evaluating gray value context of at least one adjacent detector element.

11. The image processing method of claim 7, wherein the step of finding the first gray value further comprises the step of estimating gray value context based on interpolation of gray values of two or more adjacent detector elements.

* * * * *